(12) United States Patent
Bach Castillo

(10) Patent No.: US 10,588,796 B2
(45) Date of Patent: Mar. 17, 2020

(54) SYSTEM FOR COUPLING AN AUXILIARY ELEMENT TO A WHEELCHAIR

(71) Applicant: Batec Mobility, S.L., Barcelona (ES)

(72) Inventor: Pablo Alejandro Bach Castillo, Barcelona (ES)

(73) Assignee: Batec Mobility, .L., Barcelona (ES)

( * ) Notice: Subject to any disclaimer, the term of this patent is extended or adjusted under 35 U.S.C. 154(b) by 366 days.

(21) Appl. No.: 14/903,286

(22) PCT Filed: Jul. 8, 2014

(86) PCT No.: PCT/ES2014/070556
§ 371 (c)(1),
(2) Date: Jan. 7, 2016

(87) PCT Pub. No.: WO2015/004299
PCT Pub. Date: Jan. 15, 2015

(65) Prior Publication Data
US 2016/0324703 A1    Nov. 10, 2016

(30) Foreign Application Priority Data

Jul. 8, 2013    (ES) .................................. 201331027

(51) Int. Cl.
*A61G 5/02*    (2006.01)
*A61G 5/10*    (2006.01)
(Continued)

(52) U.S. Cl.
CPC ............... *A61G 5/027* (2013.01); *A61G 5/10* (2013.01); *B62K 5/023* (2013.01); *A61G 5/047* (2013.01); *A61G 2203/78* (2013.01)

(58) Field of Classification Search
CPC ........ A61G 5/023; A61G 5/026; A61G 5/027; A61G 5/047; A61G 2203/78
(Continued)

(56) References Cited

U.S. PATENT DOCUMENTS 4,720,117 A    1/1988  Hay
5,494,126 A *  2/1996  Meeker .................. A61G 5/047
                                                180/13
(Continued)

FOREIGN PATENT DOCUMENTS

DE    3744774    7/1989
DE    4325092    2/1995
(Continued)

OTHER PUBLICATIONS

International Search Report and the Written Opinion dated Nov. 25, 2014 From the Oficina Espanola de Patentes y Marcas Re. Application No. PCT/ES2014/070556 and Its Translation of Search Report in English.
(Continued)

*Primary Examiner* — Anne Marie M Boehler

(57) ABSTRACT

The invention relates to a system for coupling an auxiliary element to a wheelchair, said auxiliary element being of the type used to convert a wheelchair into a chair in the form of a tricycle or similar, said system comprising a coupling bar for coupling an auxiliary element and a coupling accessory for coupling an auxiliary element, such that the means for coupling the coupling bar can be fitted into the coupling accessory.

13 Claims, 1 Drawing Sheet

(51) Int. Cl.
  *B62K 5/023* (2013.01)
  *A61G 5/04* (2013.01)
(58) Field of Classification Search
  USPC .......................................... 280/30, 648, 304.1
  See application file for complete search history.

(56) References Cited

U.S. PATENT DOCUMENTS

| | | | |
|---|---|---|---|
| 5,501,480 A | 3/1996 | Ordelman et al. | |
| 5,651,422 A * | 7/1997 | Casali | A61G 5/047 180/13 |
| 5,769,440 A * | 6/1998 | Jones | A61G 5/10 280/204 |
| 7,694,991 B2 * | 4/2010 | Mills | A61G 5/1051 180/11 |
| 7,976,049 B2 * | 7/2011 | Chiu | A61G 5/047 180/13 |
| 9,241,852 B2 * | 1/2016 | Dougherty | A61G 5/08 |
| 9,615,982 B2 * | 4/2017 | Richter | A61G 5/047 |
| 2004/0108147 A1 * | 6/2004 | Ross | A61G 5/047 180/13 |
| 2005/0206115 A1 * | 9/2005 | Lee | A61G 5/023 280/250.1 |
| 2007/0096427 A1 * | 5/2007 | Knaub | A61G 5/042 280/304.1 |
| 2008/0115982 A1 * | 5/2008 | Lin | A61G 5/047 180/13 |
| 2011/0095508 A1 | 4/2011 | Chiu | |
| 2011/0101642 A1 | 5/2011 | Chiu | |
| 2013/0009382 A1 * | 1/2013 | Hay | A61G 5/06 280/304.1 |

FOREIGN PATENT DOCUMENTS

| | | |
|---|---|---|
| EP | 1878417 | 1/2008 |
| ES | 1066285 | 1/2008 |
| FR | 2855492 | 12/2004 |
| GB | 383454 | 11/1932 |
| WO | WO 2015/004299 | 1/2015 |

OTHER PUBLICATIONS

Speedy Reha-Technik "Montageanleitung: Speedy-Bike", Speedy Reha-Technik GmbH, User-Guide, 16 P., Apr. 6, 2017. English Abstract.

* cited by examiner

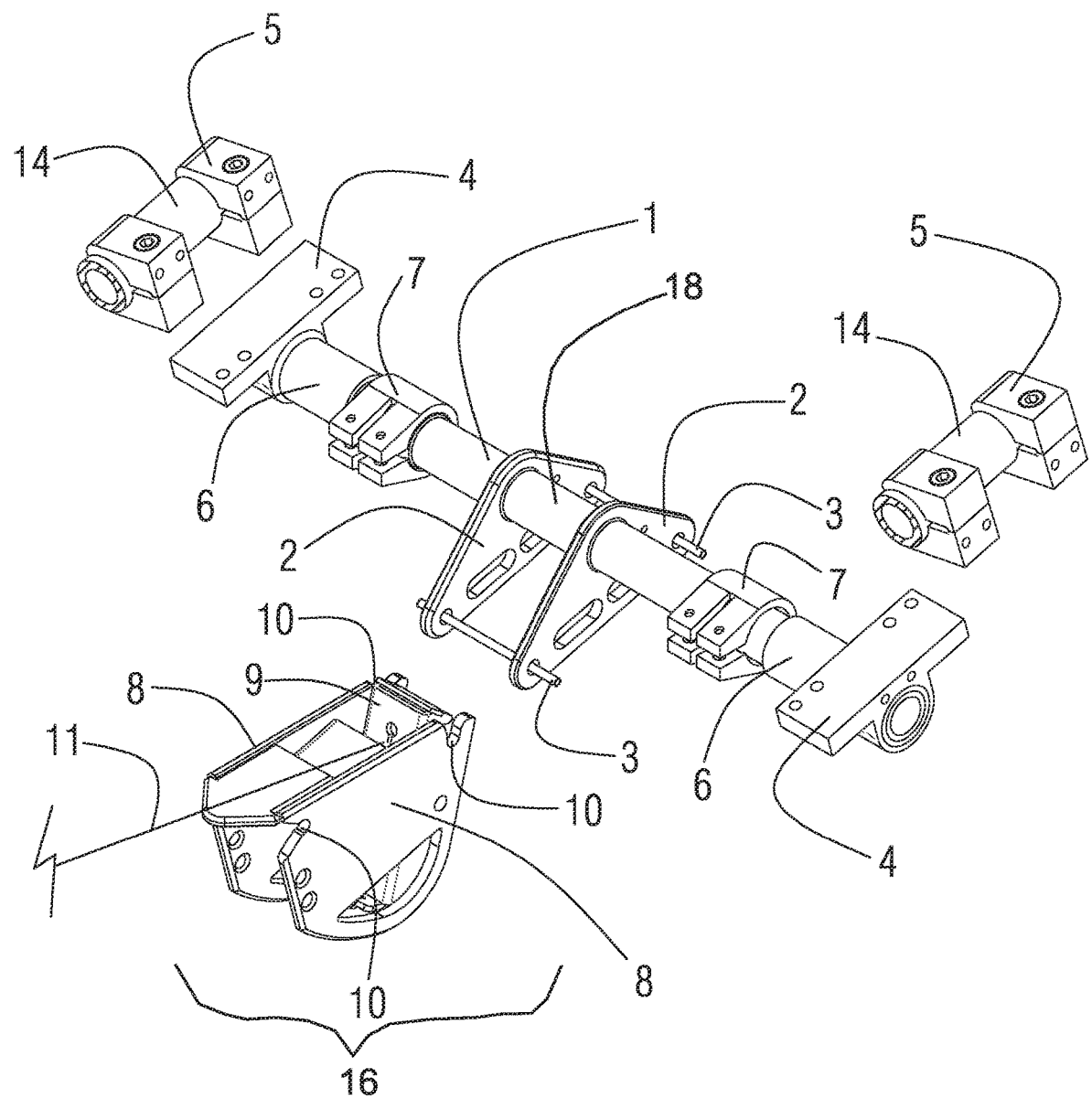

SYSTEM FOR COUPLING AN AUXILIARY ELEMENT TO A WHEELCHAIR

RELATED APPLICATIONS

This application is a National Phase of PCT Patent Application No. PCT/ES2014/070556 having International filing date of Jul. 8, 2014, which claims the benefit of priority of Spanish Patent Application No. P201331027 filed on Jul. 8, 2013. The contents of the above applications are all incorporated by reference as if fully set forth herein in their entirety.

FIELD AND BACKGROUND OF THE INVENTION

The object of the present Patent of Invention application is to register a coupling bar for coupling an auxiliary element to a wheelchair and a coupling accessory for coupling an auxiliary element to a wheelchair, which are used in a system, object of the invention, for coupling an auxiliary element to a wheelchair, and which incorporates notable innovations and advantages compared to the techniques used to date.

Additionally, the invention proposes the development of a system for coupling an auxiliary element to a wheelchair, which, due to its particular arrangement, enables an auxiliary element to be coupled to a wheelchair, the auxiliary element being of the type used to convert a wheelchair into a chair in the form of a tricycle or similar.

In the current state of the art, auxiliary elements that enable, through their particular arrangement, the conversion of a known wheelchair into a chair in the form of a tricycle or similar, with the advantages that this entails for the user, are known.

However, the coupling of such an element to a wheelchair may sometimes be problematic, especially in terms of its adaptation to a wide variety of wheelchair models, which results in an appropriate relative positioning between this element and the wheelchair itself in order to take advantage of its capacities and advantages.

In this regard, the manufacture of auxiliary elements adapted to each different model of wheelchair is required, with a consequent increase in the number of references and the lack of flexibility in the event of possible breakdowns and repairs, for example for the installer.

The present invention helps to overcome and solve the present problems, since it enables an appropriate coupling between the auxiliary element and the wheelchair, in a quick and effective way, as it adapts to a broad range of different wheelchairs with an appropriate relative positioning to make the most of its capacities and advantages.

SUMMARY OF THE INVENTION

The present invention has been developed in order to provide a coupling bar for coupling an auxiliary element to a wheelchair, the auxiliary element being of the type used to convert a wheelchair into a chair in the form of a tricycle or similar, and is essentially characterised in that it comprises a profile, such profile being provided with coupling means adapted to a coupling accessory installed in the auxiliary element, and fastening means for fastening the profile to the wheelchair.

Preferably, on the coupling bar for coupling an auxiliary element to a wheelchair, the coupling means comprise substantially parallel plates and rods arranged transversely between the plates, the plates being attached to the profile.

In addition, the coupling bar for coupling an auxiliary element to a wheelchair comprises two parallel plates and two rods transverse and perpendicular to the plates, the plates being perpendicular to the axial axis of the profile.

Alternatively, on the coupling bar for coupling an auxiliary element to a wheelchair, the profile has a substantially tubular arrangement.

Likewise, on the coupling bar for coupling an auxiliary element to a wheelchair, the fastening means for fastening the profile to the wheelchair comprise hinges, which can be fixed to clamps, said clamps in turn may be fixed to the wheelchair, such that the profile can rotate about its own axial axis, with a degree of rotation which can be locked by locking means.

In this regard, on the coupling bar for coupling an auxiliary element to a wheelchair, the hinges are fixed by screwing elements to the clamps.

Preferably, on the coupling bar for coupling an auxiliary element to a wheelchair, the hinges have tubular projections on the profile, and the fixing means comprise rings, which are in turn annular and are mounted on said tubular projections, the rings having a tightening capacity on the tubular projections of the hinges and, therefore, on the same profile.

Additionally, on the bar for coupling an auxiliary element to a wheelchair, the fastening means can slide along the profile.

The present invention has also been developed in order to provide a coupling accessory for coupling an auxiliary element to a wheelchair, the auxiliary element being of the type used to convert a wheelchair into a chair in the form of a tricycle or similar, comprising a plurality of plates, which form a housing in which an intermediate cross member is housed, and said cross member being linked to the plates so that the cross member pivots under the action of coupling means for coupling a coupling bar installed in the wheelchair, and is essentially characterised in that it comprises locking means for locking the movement of such cross member.

Preferably, in the coupling accessory for coupling an auxiliary element to a wheelchair, the locking means are embodied by a cable attached to the cross member, and said cable being equipped with an actuating control positioned on the auxiliary element.

Alternatively, in the coupling accessory for coupling an auxiliary element to a wheelchair, the locking means are embodied by a cable, a clamp and a spring, said cable being equipped with an actuating control positioned on the auxiliary element.

Additionally, the coupling accessory for coupling an auxiliary element to a wheelchair has recesses in at least one of the plates.

An object of the present invention a system for coupling an auxiliary element to a wheelchair is also the auxiliary element of the type used to convert a wheelchair into a chair in the form of a tricycle or similar, and is essentially characterised in that it comprises a coupling bar for coupling an auxiliary element and a coupling accessory, such that the means for coupling the coupling bar can be fitted into the coupling accessory.

Preferably in the system for coupling an auxiliary element to a wheelchair, the ends of the rods can be housed into the recesses.

Thanks to the present invention, an appropriate coupling between an auxiliary element, of the type used to convert a wheelchair into a chair in the form of a tricycle or similar, and the wheelchair itself is obtained in a quick and effective way, being easily adapted to a broad range of different models of wheelchairs with an appropriate relative positioning to take maximum advantage of its capacities and advantages.

In this regard, the system of the proposed invention adapts to any shape of the tubular profiles (oval, round, plates, etc.) of the wheelchair, as well as to any proportion of the chair, as for example the width of the chair or possible inclinations of the seat.

Other features and advantages of the system for coupling an auxiliary element to a wheelchair will be evident from the description of a preferred, but not exclusive, embodiment which is illustrated by way of non-limiting example in the accompanying drawings, in which:

BRIEF DESCRIPTION OF THE DRAWINGS

The FIGURE is a perspective view of a preferred embodiment of a coupling system for coupling an auxiliary element to a wheelchair, object of the invention.

DESCRIPTION OF SPECIFIC EMBODIMENTS OF THE INVENTION

As shown in FIG. 1, the system for coupling an auxiliary element to a wheelchair, the auxiliary element being of the type used to convert a wheelchair into a chair in the form of a tricycle or similar, comprises a coupling bar 18 for coupling an auxiliary element and a coupling accessory 16 for coupling an auxiliary element, such that the coupling bar 18 is equipped with coupling means, which can be fitted into the said coupling accessory 16.

In this preferred embodiment, the coupling bar 18 for coupling an auxiliary element comprises a substantially tubular profile 1. The coupling bar 18 comprises coupling means adapted to the coupling accessory 16 installed in the auxiliary element, and fastening means for fastening the profile 1 to the wheelchair.

In this preferred embodiment, the coupling means are embodied by two parallel plates 2 and two rods 3 arranged transversely and perpendicularly between the plates 2, the plates 2 being attached to the profile 1 and perpendicularly to the axial axis of the same profile 1.

In this preferred embodiment, the fastening means are embodied by hinges 4, which can be fixed to clamps 5, said clamps 5 in turn may be fixed to the chassis 14 of the wheelchair itself (not shown in its scope in the drawings and is not an object of the present invention), such that the profile 1 can rotate about its own axial axis, with a rotation degree that can be locked by locking means.

The hinges 4 are attached to the clamps 5 by screwing elements 51, which can be easily handled by the user.

The hinges 4 can be separated from the clamps 5, said clamps 5 being able to remain fixed on the chassis 14 of the wheelchair without the profile 1 and the system of the invention itself remaining coupled on the wheelchair.

In this preferred mode for carrying out the invention, the hinges 4 have tubular projections 6, which are annular and are mounted on the profile 1. The locking means are embodied by rings 7, which in turn are annular and are mounted on said tubular projections 6.

By tightening the rings 7 on the tubular projections 6, the tubular projections 6 in turn tighten on the profile 1 itself, thereby preventing said profile 1 from rotating about its own axial axis, with its degree of rotation about its own axial axis therefore being fixed.

The coupling accessory 16 for coupling an auxiliary element comprises a plurality of plates 8, which form a housing in which an intermediate cross member 9 is housed.

In this preferred embodiment, these consist of two plates 8, the cross member 9 being linked to the plates 8 such that the cross member 9 can pivot under the action of the aforementioned coupling means, which are provided on a coupling bar installed in the wheelchair described above.

The coupling accessory comprises locking means for locking the movement of the cross member 9.

In this preferred embodiment, the locking means are embodied by a cable 11 fixed to the cross member 9, and said cable being provided with an actuating control positioned on the auxiliary element itself (not shown in the drawings and not being an object of the present invention).

In other embodiments not shown in the FIGURES, the locking means may be embodied by a cable 11 and a clamp positioned by a spring. The clamp, in its position carried out by the spring, releases the cross member 9. The cable 11, in turn, is equipped with an actuating control positioned on the auxiliary element itself (not shown in the drawings and not being an object of the present invention).

When the cable 11 is pulled through the actuating control, the cable 11 in turn moves the clamp overcoming the resistance of the spring, and the clamp, in its new position determined by the cable 11, thus locks the movement of the cross member 9.

The plates 8 have recesses 10. Such recesses 10 are adapted to house the aforementioned rods 3.

The system for coupling an auxiliary element to a wheelchair of the present invention comprises a coupling bar 18 for coupling an auxiliary element and a coupling accessory 16 for coupling an auxiliary element, such that the coupling means for coupling the coupling bar 18 can be fitted into the coupling accessory 16, and are automatically connected when inserted mutually inside one another.

In this preferred embodiment, the coupling means of the coupling bar can be fitted into the coupling accessory, via housing the rods 3 of the plates 2 in the recesses 10 of the plates 8.

With the proposed invention, an auxiliary element, of the type used to convert a wheelchair into a chair in the form of a tricycle or similar, is appropriately adapted to the wheelchair itself in a quick and effective way, being adapted to a broad range of different wheelchairs with an appropriate relative positioning to take maximum advantage of its capacities and advantages.

The invention adapts to any shape of tubular profiles (oval, round, plates, etc.) of the wheelchair chassis, as well as to different proportions of the chair, such as the width of the chair or possible inclinations of the seat, for example.

The details, shapes, dimensions and other accessory elements, as well as the materials used in the manufacture of the system for coupling an auxiliary element to a wheelchair of the invention may be appropriately substituted by others that are technically equivalent and do not depart from the essence of the invention or the scope defined by the claims included below.

What is claimed is:

1. A system for coupling an auxiliary element to a wheelchair, the auxiliary element adapted to convert the wheelchair into a chair in the form of a tricycle, the system comprising:
   a coupling bar, the coupling bar comprising a profile defining an axis, the profile extending between two opposing ends of a wheelchair frame, a plurality of fasteners for releasably fastening the coupling bar to the wheelchair;
wherein each of the plurality of fasteners comprises:
a tubular projection mounted on the profile such that the entirety of the tubular projection overlaps the profile; and
a planar projection formed in one piece with the tubular projection and at least partially overlapping the profile, the planar projection releasably fixed to a clamp, wherein the clamp in turn is configured to be fixed to the wheelchair,
such that, when the plurality of planar projections are fixed to the clamps and the clamps are fixed to the wheelchair, the entire profile is configured to rotate about its axis,
a coupler mounted on the coupling bar and having a plurality of rods mechanically connected to the coupling bar below the profile,
a coupling accessory mechanically connected to the auxiliary element, the coupling accessory comprising a plurality of coupling accessory plates spaced substantially parallel to each other and defining therebetween a plurality of recesses;
wherein the plurality of rods are sized and shaped to be releasably insertable into and retained in the plurality of recesses;
wherein, when the coupling bar is fastened to the wheelchair, insertion of the plurality of rods into the plurality of recesses couples the auxiliary element to the wheelchair.

2. The system according to claim 1, wherein the coupler comprises substantially parallel coupler plates and the plurality of rods are arranged transversely between the coupler plates, the coupler plates being attached to the profile.

3. The system according to claim 2, wherein the plurality of coupler plates comprises two parallel plates defining a plane of symmetry perpendicular to the axis of the profile, and wherein the plurality of rods comprises two rods which are arranged perpendicular to the two parallel plates and parallel to the axis of the profile.

4. The system according to claim 2, wherein ends of the plurality of rods are arranged transversely between the plurality of coupler plates and extend axially beyond the plurality of coupler plates along the axis of the profile.

5. The system according to claim 1, wherein the profile has a substantially tubular arrangement.

6. The system according to claim 5, wherein the tubular projections are annular and further comprising locks defining rings which are annular and are mounted on said tubular projections, the rings configured to be tightened on the tubular projections of the hinges and thereby tighten the tubular projections onto the profile.

7. The system according to claim 1, wherein the at least one fastener is configured to be releasably fixed to the clamps with screwing elements.

8. The system according to claim 1, wherein the at least one fastener is configured to slide along the profile relative to an end of the coupling bar.

9. The system of claim 1, wherein the plurality of rods are coplanar with one another and arranged substantially parallel to the axis of the profile.

10. The system of claim 1, wherein the coupling bar comprises a single substantially tubular profile.

11. A system as defined in claim 1, wherein the profile is rotatable around its axis.

12. A system as defined in claim 11, wherein the profile is rotatable around its axis when fastened to the wheelchair.

13. A system as defined in claim 1, further comprising locks for locking the rotation of the profile.

* * * * *